Sept. 12, 1967   B V. MOLSTEDT ETAL   3,341,648
ELECTRODE INSTALLATION
Filed July 18, 1966

R. O. MAAK
B. V. MOLSTEDT    INVENTORS
L. J. DELAUNE

BY  Llewellyn A. Proctor
PATENT ATTORNEY

# United States Patent Office 3,341,648
Patented Sept. 12, 1967

3,341,648
ELECTRODE INSTALLATION
Byron V. Molstedt, Robert O. Maak, and Lawrence J. Delaune, Baton Rouge, La., assignors to Esso Research and Engineering Company, a corporation of Delaware
Filed July 18, 1966, Ser. No. 566,032
4 Claims. (Cl. 13—20)

This is a continuation-in-part of application Ser. No. 300,493, filed Aug. 7, 1963, now Patent No. 3,305,619.

The present invention is concerned with an improved electrode installation for electrically heated beds. More specifically, it concerns an improved electrode installation for an electrically heated fluid bed used in gasifying hydrocarbons to coke and hydrogen. In particular, it deals with the elimination of the short-circuiting of the electrodes and the surrounding insulating walls in electrically heated gasification reactors which ultimately results in insulation failure.

Numerous methods for converting petroleum fractions into light gasiform products, e.g., hydrogen, have been advanced in the art. While, for example, the conversion of methane or refinery tail gas to hydrogen and coke is a well-known chemical reaction, the elevated temperatures required for desirable yields result in relatively high costs for supplying requisite thermal energy. Thus, numerous processes which might have been theoretically sound are impractical when analyzed from a commercial viewpoint.

Recent advances in this art have shown that in areas where the cost of electricity is relatively cheap, e.g., 6–8 mils/kwh., this reaction can be run economically by employing electrically heated, dense fluidized beds of solids maintained at the reaction temperature. The solids are heated by a controlled electrical potential or voltage applied across one or more portions of the solids bed, the resistance of the solids to electrical flow resulting in their being heated to the desired temperatures. The magnitude of the electrical potential or voltage is normally within the range of 0.1 to 1000 volts/inch, preferably 3–20 volts/inch, and is controlled to cause resistance heating of the solids without resulting in electrical spark discharges within the solids mass. The electrical power is supplied through a plurality of electrodes emersed into the side of a dense phase of the fluidized coke. The electro-fluid reactor operates in the general temperature range of 1900–2800° F. and in the pressure range of 5 to 500 p.s.i.g. Hydrocarbon feed is injected into the dense bed during the operation of the reactor and is converted quantitatively to coke and hydrogen gas after a residence time of from about 0.2 to about 30 seconds. The solids in the fluid bed are preferably fluid coke particles from a fluid coking process or coke produced in the present process.

However, these electrically heated fluidized bed reactors, while representing a great improvement over the previous methods used in the art, still are the source of serious operational problems. The principal difficulty which has beset operation of electrically heated fluidized beds at elevated temperatures has been electrical failure. This has ensued as the result of apparent breakdown, within or in the vicinity of the fluidized bed, of the electrical insulating properties of the structural elements separating electrodes which are operating at different potentials. Such breakdowns are caused by short circuits and have been known to melt even ceramic structural elements used to retain the electrodes and fluidized bed.

Short circuits arise when conducting material, such as coke, from the fluid bed is deposited near the electrode area on or within the insulating refractory material which makes up the wall of the reactor. This allows increased current to flow through the insulating material. As this current increases, it causes the temperature of the wall to increase since it is at a high original resistance level. In turn, as the temperature rises, the electrical resistance of the insulating walls will decrease (the electrical resistance of materials is inversely proportional to their temperature). Thus, more current will pass at the lower resistance further increasing the temperature. The result is a rapidly accelerating temperature rise which will end only when the heat removed from the insulating material balances that which is being generated electrically or until the material fuses.

It has now been found that failure of insulation materials in the reactor wall due to short circuits from the electrodes can be eliminated. This is accomplished by spacing the electrode a short distance from the insulating wall. A stream of gas is blown through the interstitial area and on into the reactor. This purge gas stream serves to remove heat from the insulating wall, thereby preventing the resistance-temperature cycle from accelerating in uncontrollable fashion. Furthermore, the force of the gas flow serves to keep fluid bed material, especially hydrocarbons, out of the voids or clearances on the surface of the insulating wall, thereby preventing accumulation of electrically conductive matter such as coke therein. The gas may comprise recycle product hydrogen, insert gases (such as nitrogen, helium, argon, etc.), steam, carbon dioxide, oxygen, air, mixtures thereof, or any gas that will not interact undesirably with the reactants or products of the gasification process. It may be desired to use a mixture of gases such as recycle product hydrogen with air or steam. The added air or steam will oxidize any carbon which might have adhered to the surface of the wall or electrode while the hydrogen present will allow high gas pressure to be maintained in the purge stream without using excessive amounts of the active air or steam components. This will minimize undesirable interaction of the purge gas mixture with the fluid bed material being processed.

It has further been found that an electrode installation wherein each electrode is individually shielded by a nonporous, nonconductive refractory material such as fused alumina, beryllia, etc., is less subject to electrical failure even when operating at gasification temperatures. The nonconductive sleeve fits around the electrode between the electrode and the insulating wall and acts as a barrier to electrical short circuits through the insulation liner. Additionally, the nonporous nature of the sleeve avoids the conduction problems which arise when conductive materials deposit on wall surfaces. Use of such sleeves allows a great reduction in the quantity of purge gas needed to prevent electrical failure. The combination of a nonporous, nonconductive sleeve with a gas purge is most desirable since it results in the longest possible electrode life at a minimal equipment and maintenance cost.

Other modifications of the present invention are possible. For instance, it is possible to utilize a nonconductive sleeve which is made of a porous refractory material such as alumina. In this embodiment, the purge gas is introduced through the porous sleeve into the reactor. The flow of the gas will act to prevent deposition of conductive material within the pores and will also serve to cool the sleeve and the neighboring electrode and insulation. On the other hand, a combination of alternating porous and nonporous, nonconductive refractory sleeves may be employed to ensure freedom from electrical failure even under the most stringent of operating conditions.

In order to lessen the amount of purge gas needed, it is also possible to utilize cooling means such as a cooling element or coil to effect the cooling of the insulation and the electrode. The gas, therefore, will be used in this embodiment in an amount sufficient only to prevent deposition. Any suitable fluid known in the cooling art may be used in the coil although water is considered most desirable due to its high specific heat, low cost and non-corrosiveness.

The various aspects of the present invention will be made more clearly apparent by reference to the following description and accompanying drawings.

In the figures, all corresponding numerals represent corresponding parts in the several figures. The several figures depict an electrode installation in a fluid bed reactor, said reactor having inlet means for solids for the fluidized solids, inlet means for the hydrocarbons to be cracked, outlet means for the product and cracked vaporous products and a plurality of electrodes.

Figure 1:
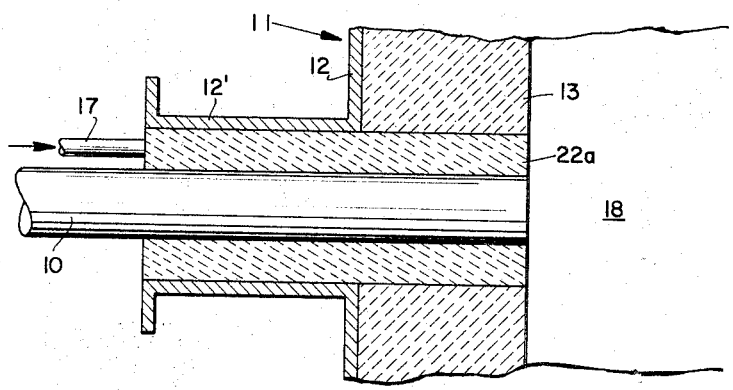
FIGURE 1 shows an electrode installation in vertical cross-section with a portion of the cell shell and insulated lining of the reactor, the installation utilizing a gas purge system combined with a nonconductive, porous refractory sleeve in vertical cross-section.

Turning now to FIGURE 1, solid elongated cylindrical electrode 10 is positioned to extend through a horizontal opening in the reactor wall 11. This wall is composed of two sections, the metal shell of the reactor 12 and insulating material 13. In a preferred embodiment, the surface of insulating material 13 which contacts the fluid bed is glazed so as to minimize the deposition of coke and the like particles thereupon. Power for electrode 10 is obtained from a power supply (not shown). The electrode is fitted into the opening in wall 11 in such a manner so as to provide means for the introduction of inert gases between the surface of the electrode and the internal surface of the opening in the reactor wall. The purge gas will move between the interior surface of insulation 13 and electrode 10 until it is exhausted into the fluidized bed contained in the internal cavity 18 of the reactor.

FIGURE 1 indicates the use of a porous refractory sleeve 22a around electrode 10. A suitable material for this purpose is alumina having pores of 50 to 500 microns internal diameter. Purge gas inlet 17 is directed into the porous sleeve. The gas which is used to both cool and prevent deposition of coke or the like flows through the sleeve and then out into cavity 18 as before. The gas functions as an effective insulator between the fluid bed and the sleeve and reduces rate of heat transfer by conduction from the bed into the sleeve 22a. The purge gas may also act to gasify carbon deposits or otherwise control the atmosphere about the electrode to protect the electrode and/or the insulation from attack. The sleeve 22a is located flush with the internal wall of insulation 13 and the end of electrode 10; however, it is also possible to utilize a space 16, as in subsequent figures, through which additional purge gas may be passed.

Figure 2:
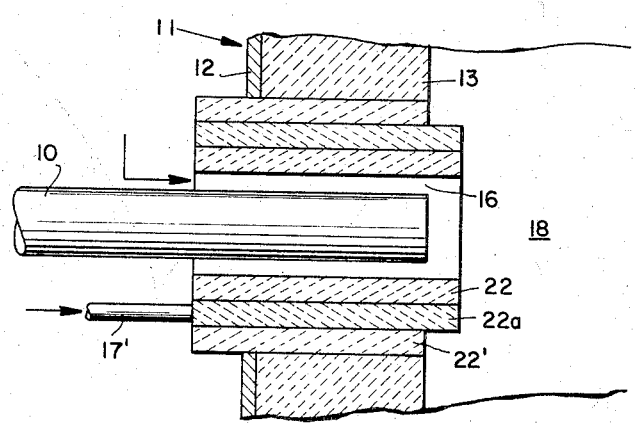
FIGURE 2 depicts an electrode installation having a gas purge system combined with alternating porous and nonporous, nonconductive refractory sleeves in vertical cross-section.

Turning to FIGURE 2, a concentric sleeve arrangement is provided. In the embodiment shown, electrode 10 is surrounded by purge gas space 16, nonporous, nonconductive refractory sleeve 22, which is surrounded by porous, nonconductive refractory sleeve 22a which in turn is surrounded by nonporous, nonconductive refractory sleeve 22'. Purge gas is supplied to space 16 while inlet line 17' provides the gas which will pass through porous sleeve 22a. As in the previous figure, the purge gas is utilized for the twin purposes of cooling the insulating and electrode surfaces and further for the prevention of deposition of foreign material within the area between the insulating wall and the electrode.

The inside refractory sleeve 22 forms a partition between the gases entering the reactor through space 16 and those entering through the porous member 22a in circumstances where such separation may be desirable.

Figure 3:
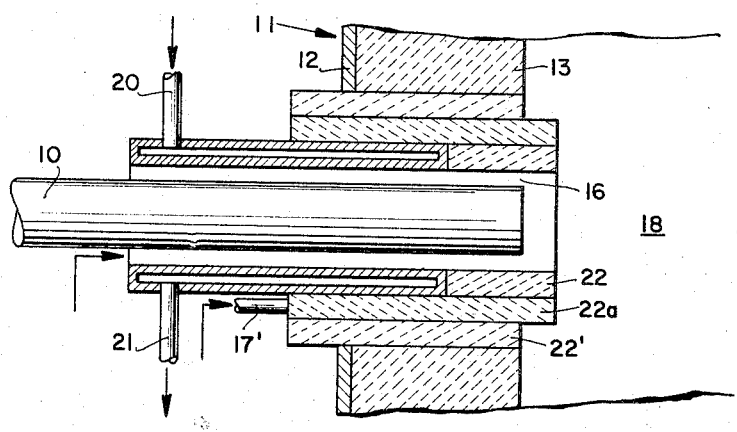
FIGURE 3 represents an electrode installation having a gas purge system combined with two types of cooling elements.

FIGURE 3 describes an electrode installation having a gas purge system, a concentrically spaced, cylindrical, nonporous refractory sleeve 22' contiguous to the wall, a concentrically spaced cylindrical, nonporous cooling element 22 which is constituted in part of a thermally conducting portion, e.g., metal, with an internal passageway, and in part an electrically nonconductive refractory sleeve portion near the forward end of the electrode 10. An additional porous cooling element 22a of the type described is interposed in the space between the latter members. Electrode 10 can also be provided with additional cooling means, as by purge gas space 16 in the manner previously described. The thermally conducting portion of cooling element 22, which extends towards cavity 18 for a distance equivalent to electrode 10, cools sleeves 22a and 22' by circulation of a cooling fluid through the internal passageway via inlet line 20 and outlet line 21.

In a specific example, an embodiment of FIGURE 1 had the following physical characteristics. The sleeve 22a is made of a porous, nonconductive refractory alumina, which sleeve is of a size to substantially fit on and around electrode 10 and to further fit within the opening in wall 11. The purging gas is hydrogen and is passed through the 100 to 200 micron sized pores of sleeve 22a at a rate of 30 s.c.f./hour when cracking 5000 s.c.f. per hour of methane at 2100° F. by passing electric current through a fluidized bed of coke particles to produce hydrogen and coke.

In an example of FIGURE 2 the following operational values are utilized while operating with the same general reaction of FIGURE 1. A purge gas consisting of hydrogen is passed through space 16, which had a thickness of 0.031 inch, at a rate of 300 s.c.f./hour. Sleeves 22, 22a and 22' and wall 11 are in continuous contact leaving no interstitial space. The same gas was passed through porous sleeve 22a at a rate of 300 s.c.f./hour. Sleeves 22 and 22a extended into cavity 18 0.75 inch beyond wall 11.

An embodiment of FIGURE 3 had the following physical characteristics. Space 16 had a distance of 0.031 inch between electrode 10 and cooling element 22. Cooling element 22a contacting sleeve 22' had a coolant circulation rate of 1 g.p.m. A purge gas consisting of hydrogen is passed through space 16 at a rate of 300 s.c.f./hour. Sleeves 22 and 22a extend into cavity 18 0.75 inch beyond wall 11.

Summarily, the present invention offers the following advantages over apparatus heretofore known in the art.

(1) Effectively prevents electrical failure due to short circuiting between the electrodes through, or on the surface of, the insulation by means of relatively inexpensive materials.

(2) Deposition of foreign particles in and about the electrode installation is prevented.

(3) Cooling of the electrode and the adjacent insulation wall is accomplished, thereby preventing a resistance-temperature cycle runaway.

While the invention is more particularly adapted for use in electrically heated fluidized beds for gasifying hydrocarbons, it may also be used in electrically heated fixed and moving beds. Reaction processes employing electrically heated beds, such as the preparation of carbon disulfide, hydrogen cyanide, calcium carbide, and further processes, such as desulfurization, calcination, and steel manufacture, are additional areas wherein the present invention may be utilized to good advantage.

What is claimed is:

1. In a high temperature electro-fluid bed reactor the combination comprising
(a) a vertical reactor wall;
(b) an opening through thre reactor wall;
(c) a dense fluidized bed of solids confined within said reactor wall;

(d) an elongated electrode, of diameter lesser than that of said opening, mounted transversely with its forward end extended through the opening and into contact with the fluidized bed of solids to produce, upon application of an electrical voltage, resistance heating of the solids without electrical spark discharges;

(e) a cooling element, of diameter intermediate that of the electrode and wall opening, circumferentially mounted within the opening and surrounding said electrode, said cooling element including
an electrically nonconductive porous refractory sleeve adapted to receive a purge gas stream through its interior;

(f) gas inlet means adapted to provide purge gas to the interior of said porous sleeve to effect cooling of the electrode during operation of the reactor.

2. The electrode installation of claim 1 wherein a single cooling element occupies the whole of the annular opening within the wall.

3. The electrode installation of claim 1 wherein the said porous sleeve comprises alumina having pores of 50 to 500 microns internal diameter.

4. The apparatus of claim 1 wherein the reactor is one containing an electrically heated fluid bed useful for gasifying hydrocarbons to coke and hydrogen at temperatures ranging from about 1900° F. to about 2800° F. and at pressures ranging from about 5 to about 500 p.s.i.g.

References Cited

UNITED STATES PATENTS

| | | | |
|---|---|---|---|
| 846,521 | 3/1907 | Stevens | 13—17 |
| 1,542,716 | 6/1925 | Payne | 13—15 |
| 2,405,236 | 8/1946 | Rhoades et al. | 13—17 |
| 3,068,343 | 12/1962 | Rossner | 219—74 X |
| 3,087,045 | 4/1963 | Correy et al. | 219—74 |

RICHARD M. WOOD, *Primary Examiner.*

V. Y. MAYEWSKY, *Assistant Examiner.*